(12) United States Patent
Mitsui et al.

(10) Patent No.: US 11,323,631 B2
(45) Date of Patent: May 3, 2022

(54) IMAGE CAPTURING DEVICE AND CONTROL METHOD

(71) Applicant: OLYMPUS CORPORATION, Tokyo (JP)

(72) Inventors: Masanori Mitsui, Machida (JP); Takuji Horie, Sagamihara (JP); Joji Sakamoto, Hachioji (JP)

(73) Assignee: OLYMPUS CORPORATION, Tokyo (JP)

( * ) Notice: Subject to any disclaimer, the term of this patent is extended or adjusted under 35 U.S.C. 154(b) by 343 days.

(21) Appl. No.: 16/744,741

(22) Filed: Jan. 16, 2020

(65) Prior Publication Data

US 2020/0154029 A1 May 14, 2020

Related U.S. Application Data

(63) Continuation of application No. PCT/JP2017/027941, filed on Aug. 1, 2017.

(51) Int. Cl.
*H04N 5/235* (2006.01)
*G06T 7/90* (2017.01)
(Continued)

(52) U.S. Cl.
CPC ............. *H04N 5/2354* (2013.01); *F21V 3/00* (2013.01); *F21V 14/003* (2013.01); *G06T 7/90* (2017.01); *H04N 5/2351* (2013.01); *G01J 3/505* (2013.01)

(58) Field of Classification Search
None
See application file for complete search history.

(56) References Cited

U.S. PATENT DOCUMENTS

| 10,314,462 | B2 * | 6/2019 | Kamee | ...................... A61B 1/05 |
| 2004/0189821 | A1 * | 9/2004 | Oda | .......................... H04N 1/48 348/223.1 |

(Continued)

FOREIGN PATENT DOCUMENTS

| JP | 2001-008220 A | 1/2001 |
| JP | 2009-168572 A | 7/2009 |
| JP | 2012-244277 A | 12/2012 |

OTHER PUBLICATIONS

International Search Report dated Oct. 24, 2017 received in PCT/JP2017/027941.

(Continued)

*Primary Examiner* — James M Hannett
(74) *Attorney, Agent, or Firm* — Scully, Scott, Murphy & Presser, P.C.

(57) ABSTRACT

An image capturing device includes: an illuminator configured to generate illumination light having wavelength bands and an illumination characteristic; an imager configured to generate an image signal by capturing light from a subject; and a processor configured to: control the illumination characteristic; set a piece of statistical data used for estimating a spectral characteristic of the subject included in the image signal; estimate the spectral characteristic of the subject included in the image signal based on the set piece of statistical data; define an illumination characteristic of illumination light in accordance with the estimated spectral characteristic of the subject; and determine whether or not the set piece of statistical data is an adequate piece of statistical data based on whether or not an image signal generated by the imager under the illumination light having the defined illumination characteristic satisfies a criterion for achromatic color.

6 Claims, 5 Drawing Sheets

(51) Int. Cl.
    *F21V 3/00*     (2015.01)
    *F21V 14/00*     (2018.01)
    *G01J 3/50*     (2006.01)

(56) References Cited

U.S. PATENT DOCUMENTS

| | | |
|---|---|---|
| 2006/0109351 A1 | 5/2006 | Ishii et al. |
| 2009/0180684 A1 | 7/2009 | Tani |
| 2014/0078285 A1 | 5/2014 | Mitsui |
| 2015/0312540 A1* | 10/2015 | Tuna .................... H04N 1/6077 |
| | | 348/223.1 |

OTHER PUBLICATIONS

Miyake, Y., Analysis and Evaluation of Digital Color Images, University of Tokyo Press, Feb. 2000, pp. 147-155.

* cited by examiner

IMAGE CAPTURING DEVICE AND CONTROL METHOD

This application is a continuation of International Application No. PCT/JP2017/027941, filed on Aug. 1, 2017, the entire contents of which are incorporated herein by reference.

BACKGROUND

The present disclosure relates to an image capturing device and a control method.

As a method for estimating a spectral characteristic of a subject, a known method is to estimate the spectral characteristic of the subject based on statistical data. As a method for estimating the spectral characteristic of the subject based on the statistical data, for example, Yoichi Miyake, "Analysis and Evaluation of Digital Color Images", University of Tokyo Press, February 2000, pp. 147-155 discloses a method using a principal component analysis and a Wiener method using an autocorrelation matrix of spectral reflectance. In these methods, the spectral characteristic of the subject is estimated at high accuracy by using adequate statistical data. However, in a case that the statistical data is incorrect, the result largely deviates from accuracy.

In view of the above, there is known a technique for selecting statistical data in accordance with each signal value from camera to estimate the spectral characteristic (see, for example, JP 2001-8220 A). The technique uses a look-up table, in which each signal value from camera is inputted and a corresponding one of the statistical data is selected and outputted. Then, based on the corresponding data, the spectral characteristic of the subject is estimated.

SUMMARY

According to one aspect of the present disclosure, there is provided an image capturing device including: an illuminator configured to generate illumination light having a plurality of wavelength bands and an illumination characteristic in accordance with a setting; an imager configured to generate an image signal by capturing light from a subject; and a processor including hardware, the processor being configured to: control the illumination characteristic of the illumination light generated by the illuminator; set a piece of statistical data used for estimating a spectral characteristic of the subject included in the image signal generated by the imager; estimate the spectral characteristic of the subject included in the image signal based on the set piece of statistical data; define an illumination characteristic of illumination light in accordance with the estimated spectral characteristic of the subject; and determine whether or not the set piece of statistical data is an adequate piece of statistical data based on whether or not an image signal generated by the imager under the illumination light having the defined illumination characteristic satisfies a criterion for achromatic color.

The above and other features, advantages and technical and industrial significance of this disclosure will be better understood by reading the following detailed description of presently preferred embodiments of the disclosure, when considered in connection with the accompanying drawings.

DETAILED DESCRIPTION

Each embodiment (hereinafter, referred to as the embodiment) will be described below with reference to the appended drawings.

Figure 1:
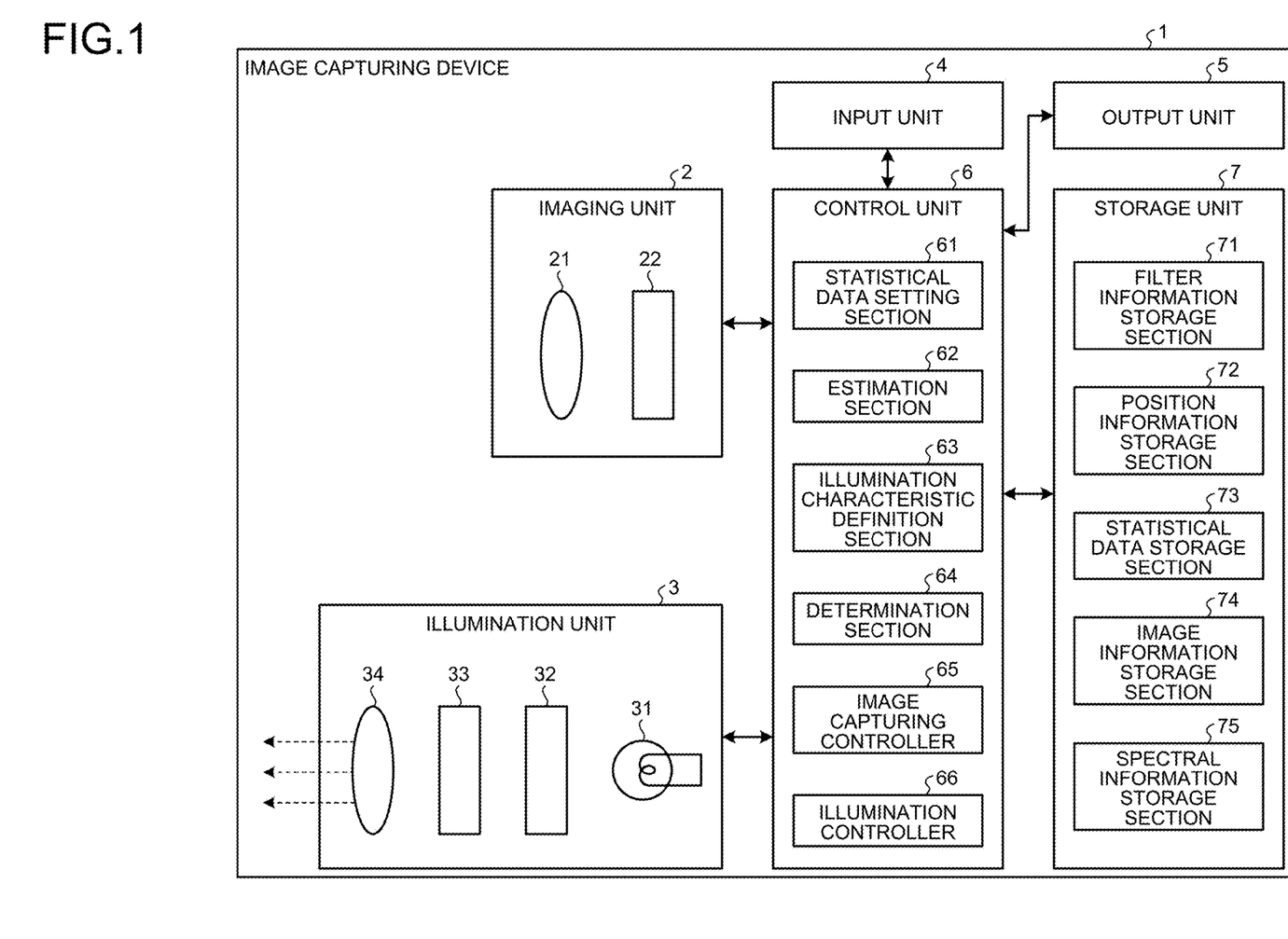
FIG. 1 is a block diagram illustrating a configuration of an image capturing device according to a first embodiment.

FIG. 1 is a block diagram illustrating a configuration of an image capturing device according to a first embodiment. An image capturing device 1 illustrated in FIG. 1 includes an imaging unit 2, an illumination unit 3, an input unit 4, an output unit 5, a control unit 6, and a storage unit 7.

The imaging unit 2 includes an imaging optical system 21 and an imaging element 22. The imaging optical system 21 collects light from a subject to form an image. The imaging element 22 performs photoelectric conversion on the light, which the imaging optical system 21 collects from the subject to form the image, to generate an image signal. The imaging optical system 21 is constituted by a single lens or a plurality of lenses. The imaging element 22 is constituted by, for example, a monochrome image sensor such as a charge coupled device (CCD) or a complementary metal oxide semiconductor (CMOS). The imaging element 22 may be an image sensor having a color filter of R, G, and B, or a multiband image sensor having four or more bands.

The illumination unit 3 generates illumination light that is composed of components at a plurality of wavelength bands and has an illumination characteristic in accordance with a setting. The illumination unit 3 includes a light source 31, a wavelength selection filter (linear variable filter; hereinafter, referred to as an LVF) 32, a liquid crystal section 33, and a diffusion optical system 34. The light source 31 emits white light, and the LVF 32 of a flat plate shape transmits the white light at a transmission wavelength varying in accordance with an incident position of the white light. The liquid crystal section 33, located closer to a side of the LVF 32 from which the light exits, selectively transmits light at a predetermined wavelength band among the light transmitted through the LVF 32. The diffusion optical system 34, located closer to a side of the liquid crystal section 33 from which the light exits, diffuses the light transmitted through the liquid crystal section 33 to equalize the light and emits the light as the illumination light.

The light source 31 emits the white light by using, for example, a light emitting diode (LED) device or a laser light source. The light source 31 may be configured to emit white LED light or white laser light. Alternatively, the light source 31 may be configured to emit the white light in combination of LED light or laser light, each including red (R), green (G), and blue (B) beams, or more beams. The light source 31 may also be constituted by a xenon lamp, a halogen lamp, or the like.

Figure 2:
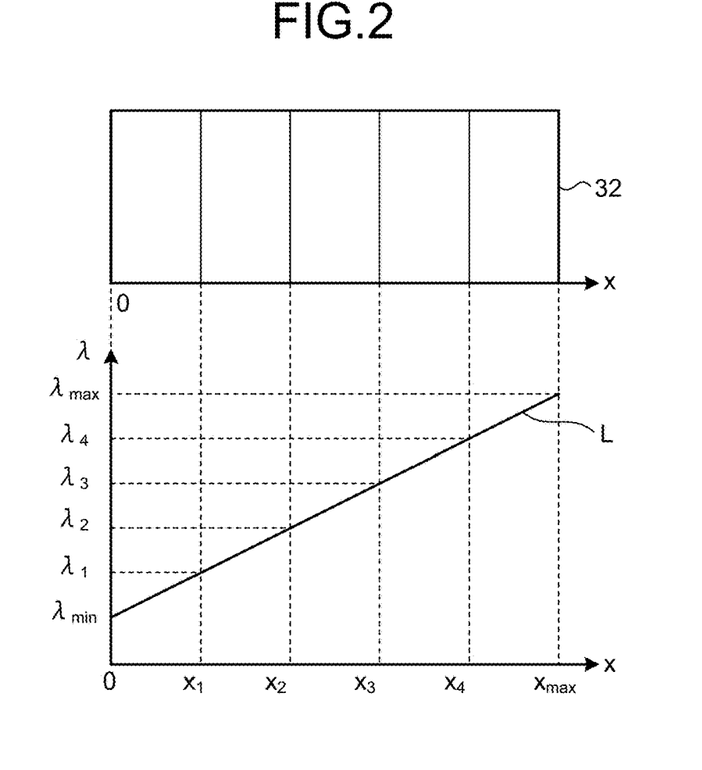
FIG. 2 schematically illustrates a characteristic of a wavelength selection filter.

The LVF 32 is flat-plate shaped and transmits the light at a transmission center wavelength that continuously changes in a direction predetermined on a main surface of the LVF 32. FIG. 2 schematically illustrates a characteristic of the LVF 32, indicating a relationship between each position of the light in the filter and the transmission center wavelength having highest transmittance at the position. In FIG. 2, a direction extending left to right and in parallel to two opposite sides of the LVF 32 is referred to as an x-axis direction. In FIG. 2, the light positioned at a left end of the LVF 32 is at x=0, and the light positioned at a right end of the LVF 32 is at $x=x_{max}$. In the LVF 32, as the position of the light in the x-axis direction changes from x=0 toward $x=x_{max}$, the transmission center wavelength λ at each of the positions continuously and linearly increases (see a straight line L in FIG. 2). The wavelength band of $\lambda_{min} \leq \lambda \leq \lambda_{max}$ represents a visible light region. For example, the transmission center wavelength $\lambda_{min}$ at x=0 (the left end of the LVF 32) equals to 380 nm, and the transmission center wavelength $\lambda_{max}$ at $x=x_{max}$ equals to 780 nm. In FIG. 2, the transmission center wavelength at $x=x_n$ (n=1 to 4; $0 < x_n < x_{max}$) is expressed as $\lambda_n$. Each of four lines extending vertically in LVF 32 in FIG. 2 is a virtual line that connects positions of the light having an equal wavelength band. These lines each extend orthogonally to the x-axis direction as the direction in which the transmission center wavelength changes in FIG. 2.

Figure 3:
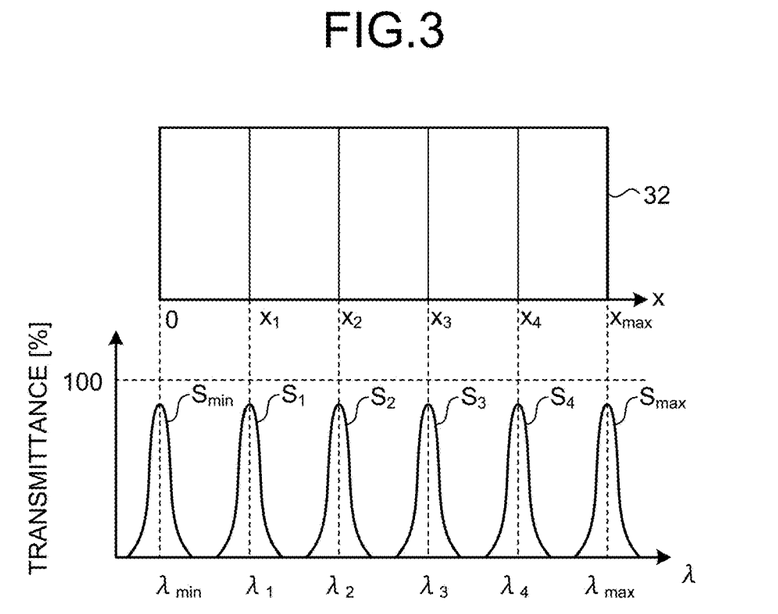
FIG. 3 schematically illustrates transmittance of light at a typical position of the wavelength selection filter.

FIG. 3 schematically illustrates the transmittance of the light at each typical position of LVF 32. FIG. 3 schematically illustrates the transmittance of the light transmitted at each of x=0, $x_n$ (n=1 to 4), and $x_{max}$. For example, a spectrum $S_{min}$ of the light transmitted at x=0 has the transmission center wavelength $\lambda_{min}$. Similarly, a spectrum $S_n$ of the light transmitted at $x=x_n$ has the transmission center wavelength $\lambda_n$, and a spectrum $S_{max}$ of the light transmitted at $x=x_{max}$ has the transmission center wavelength $\lambda_{max}$. As clearly seen in FIG. 3, the spectrum of the light transmitted at each of the positions in the LVF 32 has substantially uniform transmittance at the transmission center wavelength, and has a substantially uniform wavelength band width.

The illumination unit 3 may be constituted by other type of filters instead of an LVF. For example, the illumination unit 3 may employ a multi-color LED light source, in which a plurality of LEDs, each emitting light in four or more colors at a different wavelength band, are two-dimensionally arranged and aligned.

The liquid crystal section 33 is located closer to the side of the LVF 32 from which the light exits, and employs a liquid crystal panel capable of selectively emitting the light at the predetermined wavelength band among the light transmitted through the LVF 32. The liquid crystal section 33 is under control of the control unit 6 and varies a liquid crystal module state in each region to selectively switch between transmission and non-transmission of the light in accordance with the incident position of the light. The transmission wavelength band of the light transmitted through the LVF 32 and the incident position of the light in the liquid crystal section 33 correspond to each other, and are stored in a position information storage section 72 of the storage unit 7 as will be described later.

Figure 4:
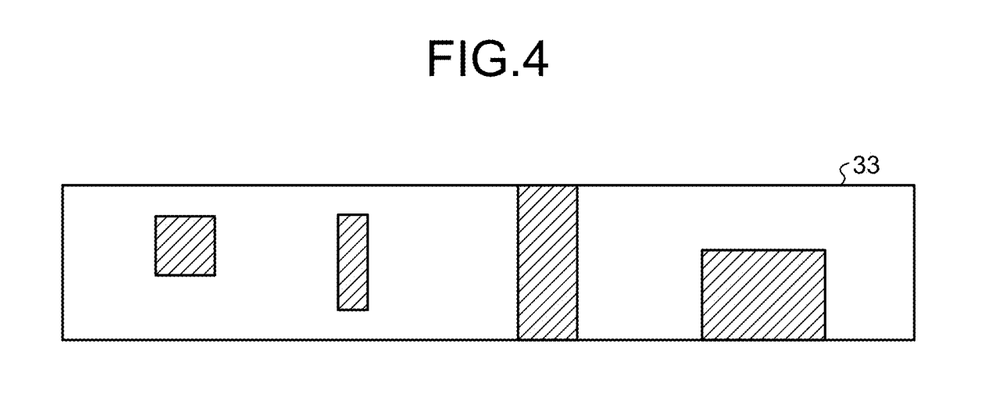
FIG. 4 illustrates an example of a region in a liquid crystal section that is selected to transmit the light.

FIG. 4 illustrates an example of a region in the liquid crystal section 33 selected to transmit the light. In FIG. 4, the region selected to transmit the light is schematically illustrated by hatched line. A direction extending left to right corresponds to the direction in which the wavelength changes in the LVF 32. Each of the regions selected to transmit the light has a width in the direction extending left to right, and the width corresponds to a size of the wavelength band of the light transmitted. In FIG. 4, a height of top to bottom corresponds to an amount of the light transmitted. For example, among the regions selected to transmit the light, the region as the second from the right in FIG. 4 extends through top and bottom and thus includes the largest amount of light (wavelength component) transmitted. Each of the regions selected to transmit the light may have other shapes in addition to a rectangular shape.

The diffusion optical system 34 is constituted by, for example, a diffusion plate for diffusing luminous flux, and an optical element for equalizing the luminous flux diffused by the diffusion plate. The diffusion optical system 34 is configured to diffuse the light transmitted through the liquid crystal section 33 to equalize an illuminance distribution of the light, and configured to irradiate the subject with the luminous flux as the illumination light.

The illumination unit 3 generates the illumination light composed of the components at the plurality of different wavelength bands, each of the components having a characteristic in accordance with the corresponding setting. The illumination unit 3 simultaneously emits the illumination light including these components. Each of the components included in the illumination light has the different wavelength bands, and the number of the wavelength bands as well as the full width at half maximum of each of the wavelength bands may be inputted by a user into the input unit 4 for setting. Alternatively, the illumination unit 3 may sequentially (in a time-divided way) emit the illumination light including each of the components.

The input unit 4 receives various input signals including an instruction signal for operating the image capturing device 1. The input unit 4 includes an input device such as a keyboard, various buttons, or various switches, and a pointing device such as a mouse or a touch panel. The input unit 4 receives signals externally inputted by operating these devices, and outputs the signals to the control unit 6. The input unit 4 may also employ a sound input microphone.

The output unit 5 outputs various information including the image corresponding to the image signal generated by the imaging unit 2. The output unit 5 includes a monitor, e.g., liquid crystal or organic electro luminescence (EL), for outputting the various information including a picture or a character, and a speaker for outputting sound.

The control unit 6 includes a statistical data setting section 61, an estimation section 62, an illumination characteristic definition section 63, a determination section 64, an image capturing controller 65, and an illumination controller 66.

The statistical data setting section 61 selects one (a piece of statistical data) among a plurality of statistical data, which are stored in a statistical data storage section 73 of the storage unit 7, and sets the piece of statistical data. In the first embodiment, the image capturing device 1 internally stores the plurality of statistical data. Alternatively, the plurality of statistical data may be stored in an external database, to which the statistical data setting section 61 refers via network to set the piece of statistical data.

The estimation section 62 uses the piece of statistical data set by the statistical data setting section 61 to estimate a spectral characteristic of the subject. The spectral characteristic of the subject is included in the image signal generated by the imaging unit 2. The estimation section 62 estimates the spectral characteristic of the subject in, for example, a method using a principal component analysis or a Wiener method using an autocorrelation matrix of spectral reflectance (see Yoichi Miyake, "Analysis and Evaluation of Digital Color Images", University of Tokyo Press, February 2000, pp. 147-155). The estimation section 62 may estimate the spectral characteristic based on an entire part of the image signal, or alternatively, may estimate the spectral characteristic based on a part of the image signal that is predetermined as a region of interest (ROI).

Based on the spectral characteristic of the subject estimated by the estimation section 62, the illumination characteristic definition section 63 defines the illumination characteristic of the illumination light emitted from the illumination unit 3. With regard to the illumination unit 3 configured as previously described, the illumination characteristic definition section 63 defines the illumination characteristic, such as a parameter for setting the portion in the liquid crystal section 33 to transmit the light. Specifically, the illumination characteristic definition section 63 defines the illumination characteristic such that a large/small relationship between the illumination characteristic and the spectral characteristic is relatively reverse at each wavelength. The illumination characteristic defined by the illumination characteristic definition section 63 together with the spectral characteristic of the subject estimated by the estimation section 62 are stored in a spectral information storage section 75 of the storage unit 7.

The determination section 64 determines whether or not the image signal, which is generated by the imaging unit 2 under the illumination light having the illumination characteristic defined by the illumination characteristic definition section 63, satisfies a criterion for achromatic color. Based on the determination, the determination section 64 determines whether or not the piece of statistical data set by the statistical data setting section 61 is adequate. The determination section 64 determines that the piece of statistical data used for capturing the image is adequate when the image signal satisfies the criterion for achromatic color. On the other hand, the determination section 64 determines that the piece of statistical data used for capturing the image is inadequate when the image signal does not satisfy the criterion for achromatic color. The criterion for achromatic color herein is defined in that, for example, a chroma has a predetermined range of value in a vicinity of zero at all the wavelengths. The predetermined range may be arbitrarily set. When the spectral characteristic estimated completely matches a spectral characteristic actually obtained, the light reflected from the subject has the achromatic color. When the determination section 64 determines that the piece of statistical data is inadequate, the statistical data setting section 61 sets another piece of statistical data.

The image capturing controller 65 controls an operation of capturing the image in the imaging unit 2 by controlling, for example, a frame rate or an exposure in the imaging unit 2.

The illumination controller 66 synchronizes with the image capturing controller 65, and concurrently controls an operation in the illumination unit 3 based on the illumination characteristic defined by the illumination characteristic definition section 63. Specifically, the illumination controller 66 controls the state of the liquid crystal section 33 at a predetermined timing, so that the liquid crystal section 33 is controlled to select a pattern of transmitting the light (component) at each of the wavelengths. As a result, the illumination unit 3 generates and emits the illumination light having the illumination characteristic defined.

The control unit 6 is constituted by, for example, a general processor such as a central processing unit (CPU), or a specialized integrated circuit for performing a specific function, such as an application specific integrated circuit (ASIC) or a field programmable gate array (FPGA). The control unit 6 reads various programs stored in the storage unit 7 to perform various arithmetic processes in the image capturing device 1. These arithmetic processes include predetermined image processing performed on the image signal generated by the imaging unit 2. The predetermined image processing includes, for example, an A/D conversion, a white-balance adjustment, a γ correction, compression-expansion, or the like.

The storage unit 7 includes a filter information storage section 71, the position information storage section 72, the statistical data storage section 73, an image information storage section 74, and the spectral information storage section 75. The filter information storage section 71 stores a transmission characteristic including the wavelength band of the light transmitted at each of the positions in the LVF 32. The position information storage section 72 stores each of the positions in the LVF 32 at which the light transmits, and the incident position of the light in the liquid crystal section 33 in correspondence to each of the positions in the LVF 32 at which the light transmits. The statistical data storage section 73 stores the plurality of statistical data that the statistical data setting section 61 uses for setting. The image information storage section 74 stores the image signal that the imaging unit 2 generates by capturing the image. The spectral information storage section 75 stores the spectral characteristic that the estimation section 62 estimates, and the illumination characteristic that the illumination characteristic definition section 63 defines in accordance with the spectral characteristic estimated. The image information that the image information storage section 74 stores and the spectral information that the spectral information storage section 75 stores are correlated to each other.

The storage unit 7 stores the plurality of programs and various setting information that the control unit 6 executes. The programs may be written and stored in a computer readable recording medium. The programs may be written in the storage unit 7 or the computer readable recording medium when shipping the computer or the recording medium as a product. Alternatively, the programs may be written by downloading via communication network.

The storage unit 7 is constituted by a volatile memory such as a random access memory (RAM), and a nonvolatile memory such as a read only memory (ROM). Alternatively, the storage unit 7 may be constituted by an externally mountable and computer readable recording medium, such as a memory card.

Figure 5:
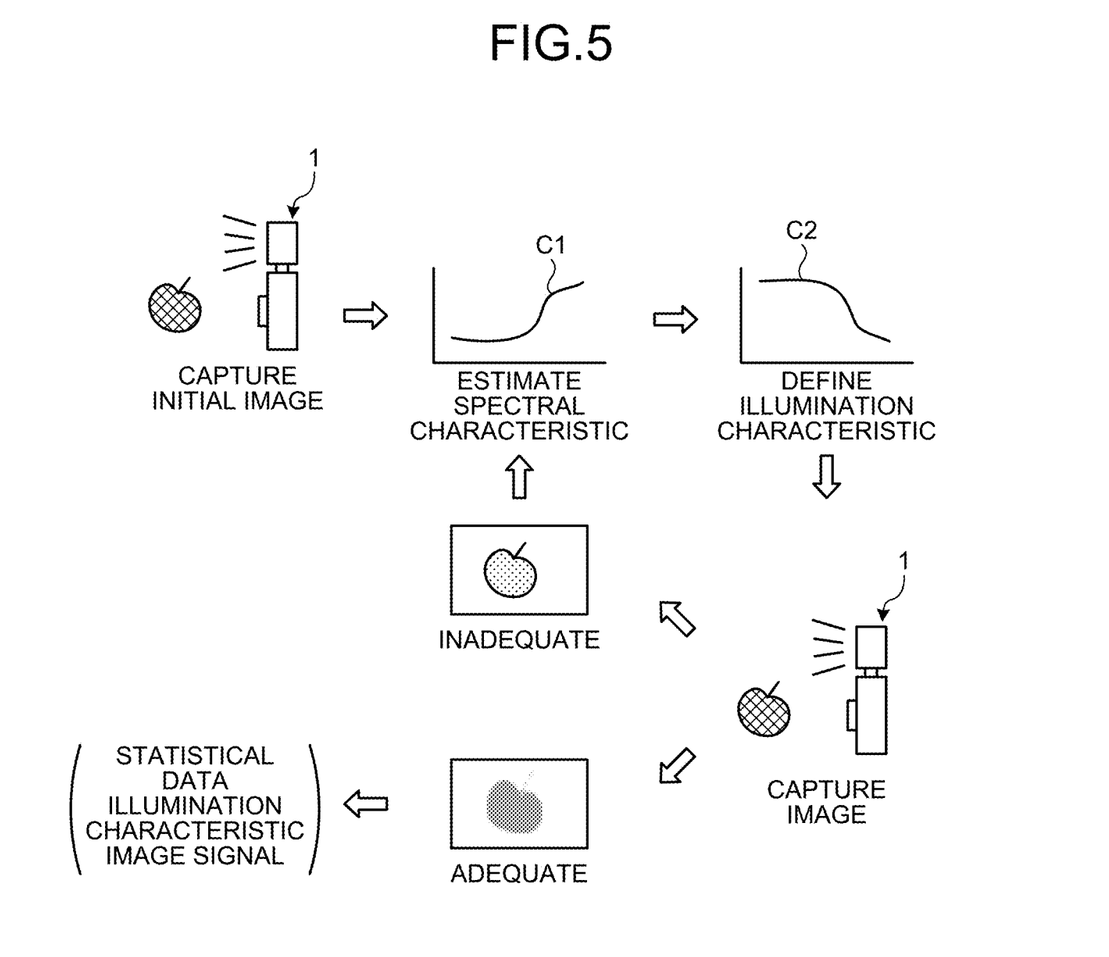
FIG. 5 illustrates an overview of a process performed in the image capturing device according to the first embodiment.

FIG. 5 illustrates an overview of a process performed in the image capturing device 1. First, the imaging unit 2 captures an initial image of the subject to generate an image signal. Based on the image signal, the statistical data setting section 61 sets a piece of statistical data, and the estimation section 62 uses the piece of statistical data to estimate a spectral characteristic. In FIG. 5, a curved line C1 illustrates a wavelength spectrum of the spectral characteristic in a graph where a horizontal axis represents the wavelength and a vertical axis represents the spectral characteristic.

Subsequently, the illumination characteristic definition section 63 defines an illumination characteristic to balance the spectral characteristic estimated. In FIG. 5, a curved line C2 illustrates a wavelength spectrum of the illumination characteristic in a graph where a horizontal axis represents the wavelength and a vertical axis represents the illumination characteristic. The curved line C2 illustrates the illumination characteristic at each of the wavelengths that is provided to balance the spectral characteristic illustrated by the curved line C1. Each of the curved line C1 and the curved line C2 has a shape in which the large/small relationship to the other at each of the wavelengths is relatively reverse. The curved line C2 is different in amount indicated on the vertical axis from the curved line C1, while apparently, the curved line C2 has a shape corresponding to the curved line C1 that is inverted upside-down on the horizontal axis.

Then, the illumination unit 3 irradiates the subject with the illumination light having the illumination characteristic defined. In this state, the image capturing device 1 captures an image of the subject. When the spectral characteristic of the subject matches the spectral characteristic estimated, the spectral characteristic is balanced by the illumination characteristic of the illumination light that is applied to the subject. As a result, an image signal, having the achromatic color in which the chroma is zero at all the wavelengths, is obtained.

The determination section 64 determines that the piece of statistical data used for capturing the image is adequate when the image signal satisfies the criterion for achromatic color. In this case, the control unit 6 outputs the piece of statistical data determined as adequate, the illumination characteristic of the illumination light defined based on the piece of statistical data, and the image signal generated by capturing the image under the illumination light having the illumination characteristic to the storage unit 7. The piece of statistical data determined as adequate, the illumination characteristic, and the image signal outputted from the control unit 6 are all correlated to each other, and stored in the storage unit 7.

On the other hand, the determination section 64 determines that the piece of statistical data used for capturing the image is inadequate when the image signal does not satisfy the criterion for achromatic color. When the determination section 64 determines that the piece of statistical data is inadequate, the statistical data setting section 61 sets another piece of statistical data, based on which the estimation section 62 estimates a spectral characteristic again. Subsequently, the illumination characteristic definition section 63 defines an illumination characteristic again, and the imaging unit 2 captures an image again under illumination light having the illumination characteristic. These process steps are repeated until the determination section 64 determines that the piece of statistical data set is adequate.

Figure 6:
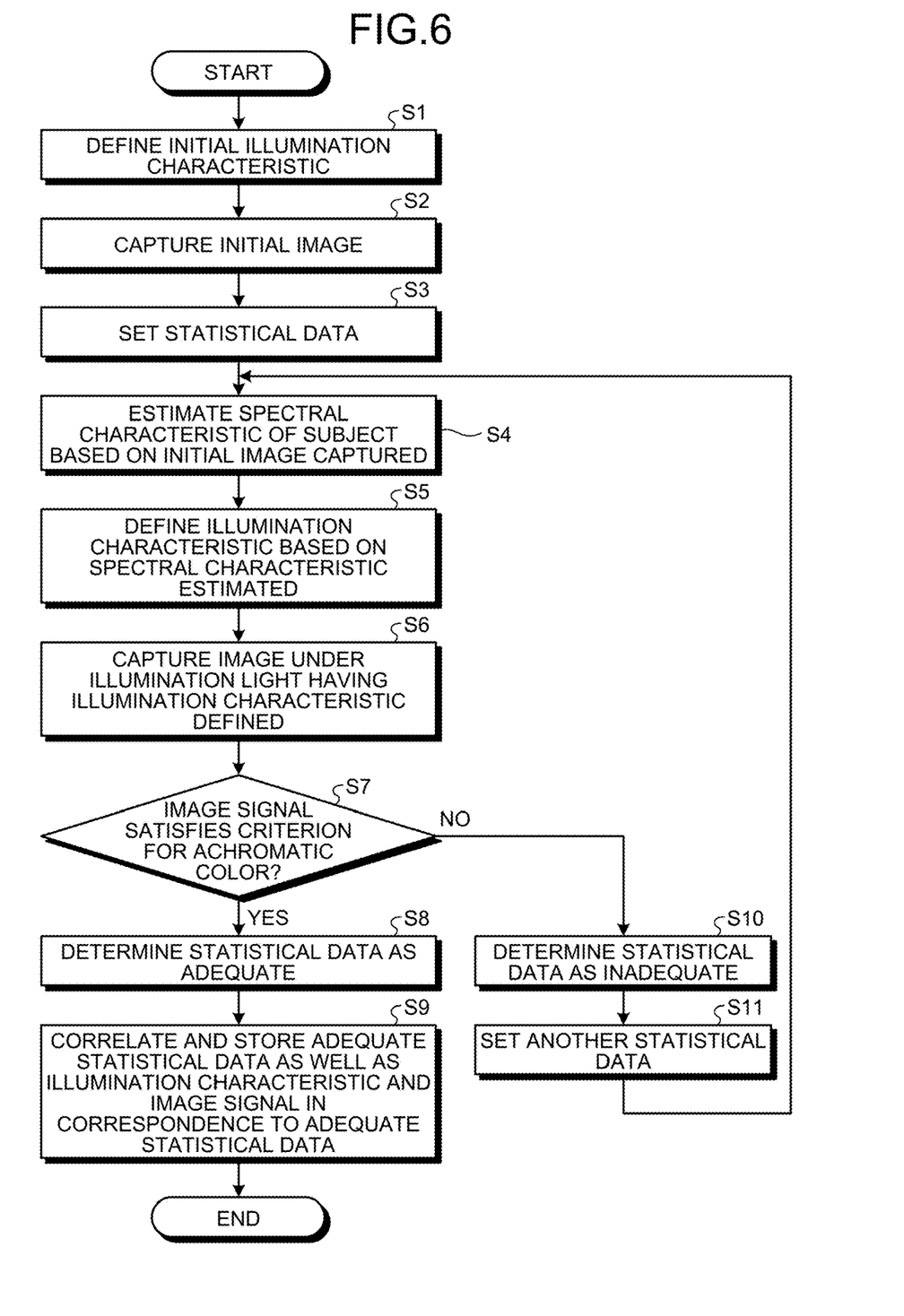
FIG. 6 is a flowchart for explaining an overview of the process performed in the image capturing device according to the first embodiment.

The process described above will be described in more detail below with reference to a flowchart in FIG. 6. First, the illumination characteristic definition section 63 defines an initial illumination characteristic (step S1). The initial illumination characteristic may be previously defined, or may be inputted by the user into the input unit 4 each time.

Subsequently, the image capturing device 1 captures an initial image (step S2). Here, the illumination controller 66 causes the illumination unit 3 to generate illumination light having the set illumination characteristic. The image capturing controller 65 causes the imaging unit 2 to capture the image at timing that the illumination light having the set illumination characteristic is emitted.

Then, the statistical data setting section 61 selects one (a piece of statistical data) among the plurality of statistical data, which are stored in the statistical data storage section 73, and sets the piece of statistical data (step S3). The estimation section 62 uses the piece of statistical data set by the statistical data setting section 61 and an image signal obtained by the imaging unit 2 to estimate a spectral characteristic of the subject (step S4). As a result, the curved line C1 illustrated in FIG. 5 is obtained.

Based on the spectral characteristic estimated, the illumination characteristic definition section 63 defines an illumination characteristic of illumination light that the illumination unit 3 emits (step S5). The illumination characteristic definition section 63 defines the illumination characteristic of the illumination light such that the light reflected from the subject is substantially constant at any wavelengths and satisfies the criterion for achromatic color. The illumination characteristic in this state is illustrated by, for example, the curved line C2 in FIG. 5.

The illumination controller 66 causes the illumination unit 3 to emit the illumination light having the illumination characteristic defined. The image capturing controller 65 causes the imaging unit 2 to capture an image under the illumination light having the illumination characteristic defined (step S6).

The determination section 64 determines whether or not an image signal generated based on the image captured in the imaging unit 2 satisfies the criterion for achromatic color (step S7). When the determination section 64 determines that the image signal satisfies the criterion for achromatic color (step S7: Yes), the determination section 64 determines that the piece of statistical data set most recently by the statistical data setting section 61 is adequate (step S8).

Subsequently, the control unit 6 writes to store the piece of statistical data determined as adequate into the statistical data storage section 73, the illumination characteristic in correspondence to the piece of statistical data into the spectral information storage section 75, and the image signal in correspondence to the piece of statistical data into the image information storage section 74. The piece of statistical data determined as adequate, the illumination characteristic, and the image signal stored into these units are all correlated to each other (step S9). Here, the illumination characteristic in correspondence to the piece of statistical data indicates the illumination characteristic defined based on the piece of statistical data. The image signal in correspondence to the piece of statistical data indicates the image signal generated by capturing the image under the illumination light having the illumination characteristic. The piece of statistical data determined as adequate, the illumination characteristic, and the image signal may be correlated to each other by using, for example, a common flag.

In the step S7, when the determination section 64 determines that the image signal does not satisfy the criterion for achromatic color (step S7: No), the determination section 64 determines that the piece of statistical data set most recently by the statistical data setting section 61 is inadequate (step S10). Subsequently, the statistical data setting section 61 refers back to the statistical data storage section 73 to select another piece of statistical data for setting (step S11). Then, the image capturing device 1 returns to the step S4.

Note that the image signals generated by the imaging unit 2 in the step S2 and the step S6 may be specifically used for determining on the criterion for achromatic color. The control unit 6 typically performs various image processing when capturing images, but in this case, the control unit 6 is not required of the various image processing on these image signals generated. This configuration speeds up the determination by the determination section 64. In a case that the image capturing device 1 captures the images in the step S2 and the step S6 as preliminary image capturing (pre-image capturing), the image capturing device 1 may perform typical image capturing by using the piece of statistical data determined as adequate when having completed the series of process steps.

In the step S4, in a case that the spectral characteristic is estimated based on a part of the image signal as the region of interest, the image capturing device 1 may estimate the spectral characteristic based on the image signal by using the piece of statistical data determined as adequate when having completed the series of process steps.

In the step S9, the image signal in correspondence to the piece of statistical data determined as adequate may be replaced with the image signal generated by capturing the initial image, and then, the control unit 6 may store the image signal into the image information storage section 74. Similarly, the illumination characteristic in correspondence to the piece of statistical data determined as adequate may be replaced with the illumination characteristic of the illumination light emitted for capturing the initial image. Then, the control unit 6 may store the illumination characteristic into the spectral information storage section 75. The piece of statistical data determined as adequate, the image signal, and the illumination characteristic stored into these units are all correlated to each other.

Additionally, in a case that the image signal has multiple regions of interest, the image capturing device 1 performs the series of process steps on each of the multiple regions of interest.

In the step S7, when the image capturing device 1 determines that the image signal satisfies the criterion for achromatic color, the imaging unit 2 may capture an image again under the white light replaced as the illumination light, and output the image together with the piece of statistical data selected. In this case, the image captured is visually identified with ease.

As has been described above, an image capturing device according to the first embodiment defines an illumination characteristic of illumination light in accordance with a spectral characteristic of a subject estimated by using a piece of statistical data. The image capturing device determines whether or not an image signal generated by capturing an image under the illumination light having the illumination characteristic satisfies the criterion for achromatic color. Based on the determination, the image capturing device determines whether or not the piece of statistical data used is adequate. With the piece of statistical data determined as adequate, the image capturing device succeeds in estimating the spectral characteristic at high accuracy.

In the image capturing device according to the first embodiment, when the piece of statistical data has been already set and the image signal generated by capturing the image based on the piece of statistical data already set does not satisfy the criterion for achromatic color, another piece of statistical data is set by referring to the image captured based on the piece of statistical data already set. Accordingly, repeated setting of another piece of statistical data results in a more adequate piece of statistical data.

Further, in the image capturing device according to the first embodiment, the image satisfying the criterion for achromatic color is outputted together with the illumination characteristic and the piece of statistical data used to capture the image. The image obtained in this configuration has a less variable signal level at each of wavelengths and an equivalent signal to noise ratio at each of the wavelengths.

In a modification of the first embodiment, the determination section 64 generates deviation information, i.e., information on deviation from the criterion for achromatic color. In this case, when the statistical data setting section 61 sets another piece of statistical data for the second and subsequent time, the statistical data setting section 61 refers to the deviation information included in the previous determination result to select another piece.

For example, the estimation section 62 estimates a spectral characteristic by using a piece of statistical data set for the first time, and an image is captured under illumination light having an illumination characteristic defined in accordance with the spectral characteristic estimated. When the image captured includes a blue component, in other words, when the spectral characteristic actually obtained is presumed to have higher blue reflectance than the spectral characteristic estimated, the deviation information corresponding to the blue component is generated. Then, the statistical data setting section 61 sets another piece of statistical data (as a piece of data selected for the second time) based on the deviation information. In this case, the statistical data setting section 61 selects another piece of statistical data that causes higher blue reflectance than the piece of statistical data selected for the first time.

The image capturing device according to this modification gains the deviation information regarding achromatic color through the determination by the determination section 64, and uses the deviation information to set another piece of statistical data. Accordingly, the image capturing device finds a piece of statistical data to be determined as adequate in a quicker way than selecting another piece of statistical data in a predetermined sequential order.

An image capturing device according to the second embodiment sets all pieces of statistical data settable and captures an image based on each of all the pieces of statistical data set. Then, the image capturing device selects a piece of statistical data that most conforms to the criterion for achromatic color among all these pieces, and determines the piece of statistical data as most adequate. The image capturing device according to the second embodiment has a configuration identical to the configuration of the image capturing device 1 described in the first embodiment (see FIG. 1).

Figure 7:
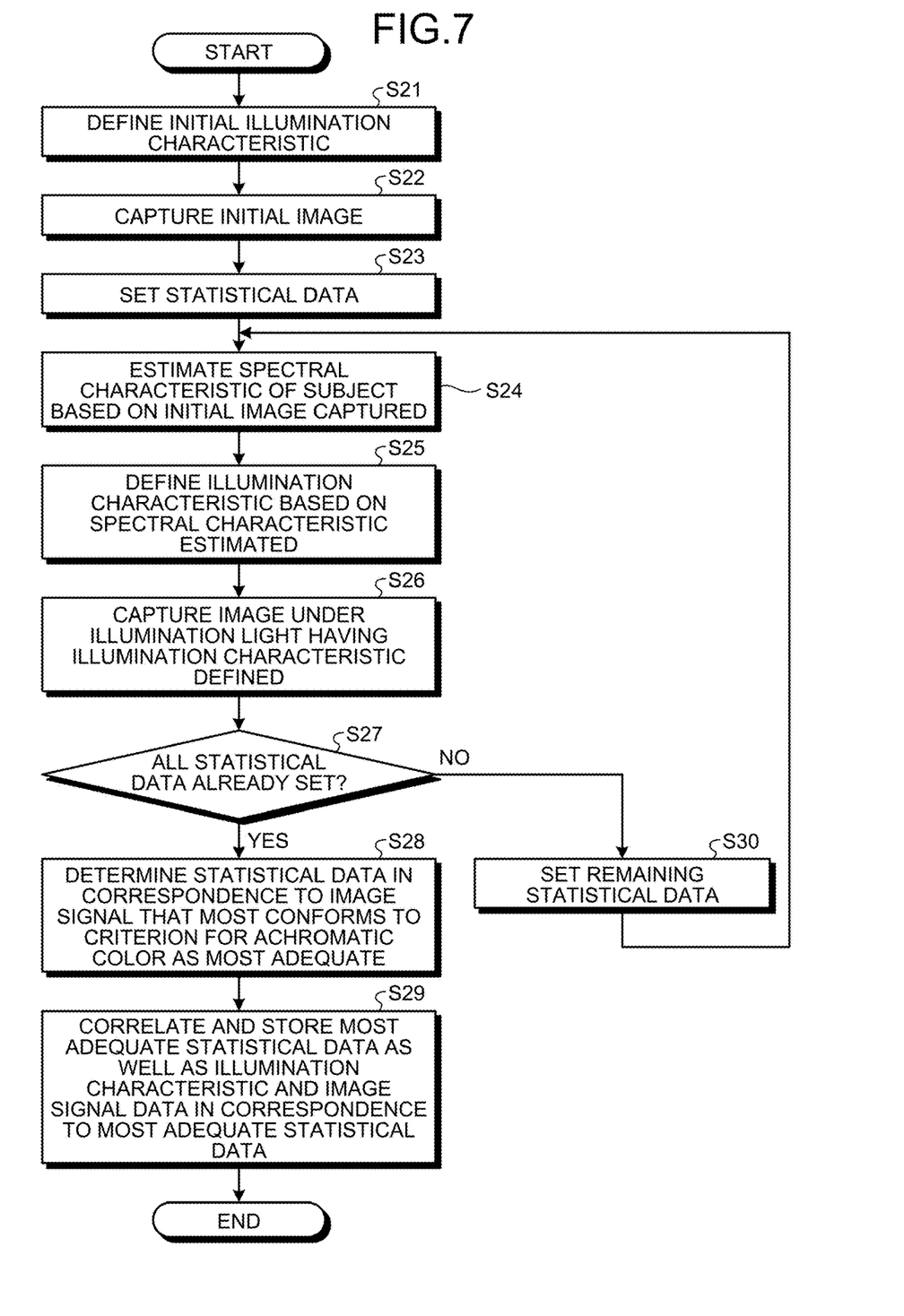
FIG. 7 is a flowchart for explaining an overview of a process performed in an image capturing device according to a second embodiment.

FIG. 7 is a flowchart for explaining an overview of a process performed in the image capturing device according to the second embodiment. In FIG. 7, steps S21 to S26 respectively correspond to the steps S1 to S6 described in the first embodiment.

In step S27, the determination section 64 determines whether or not the statistical data setting section 61 has set all the pieces of statistical data. When the determination section 64 determines that the statistical data setting section 61 has set all the pieces of statistical data (step S27: Yes), the determination section 64 determines whether or not an image signal based on each of all the pieces of statistical data satisfies the criterion for achromatic color. Then, among all the pieces of statistical data, the determination section 64 selects a piece of statistical data in correspondence to an image signal that most conforms to the criterion for achromatic color, and determines the piece of statistical data as most adequate (step S28). The "image signal that most conforms to the criterion for achromatic color" is an image signal based on a spectral characteristic that is most equalized at any wavelengths, in other words, an image signal closest to achromatic color.

Subsequently, the image capturing device 1 stores the piece of statistical data determined as most adequate into the statistical data storage section 73, the illumination characteristic in correspondence to the piece of statistical data into the spectral information storage section 75, and the image signal in correspondence to the piece of statistical data into the image information storage section 74. The piece of statistical data determined as most adequate, the illumination characteristic, and the image signal stored into these units are all correlated to each other (step S29).

In the step S27, when the determination section 64 determines that the statistical data setting section 61 has not set all the pieces of statistical data (step S27: No), the statistical data setting section 61 refers back to the statistical data storage section 73 to select and set a piece of statistical data remaining (step S30). Then, the image capturing device 1 returns to step S24.

As has been described above, an image capturing device according to the second embodiment succeeds in estimating a spectral characteristic at high accuracy by using a piece statistical data determined as adequate, as with the image capturing device according to the first embodiment.

Further, the image capturing device according to the second embodiment performs determination on all the pieces of statistical data settable to select a piece of statistical data in correspondence to an image signal that most conforms to the criterion for achromatic color. In this configuration, the image capturing device determines the piece of statistical data as most adequate, and thus optimizes the statistical data.

An embodiment has been described above; however, the present disclosure is not limited to the foregoing first and second embodiments. For example, a method for estimating a spectral characteristic includes other methods, in addition to the method using principal component analysis and the Wiener method, each described above. A specific example includes a multiple regression model. In the multiple regression model, a coefficient providing polynomial curve approximation is used to set a piece of statistical data. Another example includes a maximum likelihood estimation method or a Bayesian estimation method. When the maximum likelihood estimation method or the Bayesian estimation method is applied, a probability density function is used to set a piece of statistical data.

Alternatively, a machine learning method may be used to set a piece of statistical data. For example, a plurality of statistical data for learning, each different from the others, are provided with a plurality of machine learning boxes. Each of the plurality of machine learning boxes stores a learning result, and based on the learning result, the statistical data setting section selects and sets a piece of data presumed to be most adequate. An example of the machine learning includes a deep learning based on a neural network with multiple layers or the like.

According to the present disclosure, spectral estimation at high accuracy by using an adequate piece of statistical data can be realized.

Additional advantages and modifications will readily occur to those skilled in the art. Therefore, the disclosure in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An image capturing device comprising:
an illuminator configured to generate illumination light having a plurality of wavelength bands and an illumination characteristic in accordance with a setting;
an imager configured to generate an image signal by capturing light from a subject; and
a processor comprising hardware, the processor being configured to:

control the illumination characteristic of the illumination light generated by the illuminator;
set a piece of statistical data used for estimating a spectral characteristic of the subject included in the image signal generated by the imager;
estimate the spectral characteristic of the subject included in the image signal based on the set piece of statistical data;
define an illumination characteristic of illumination light in accordance with the estimated spectral characteristic of the subject; and
determine whether or not the set piece of statistical data is an adequate piece of statistical data based on whether or not an image signal generated by the imager under the illumination light having the defined illumination characteristic satisfies a criterion for achromatic color.

2. The image capturing device according to claim 1, wherein the processor is configured to define the illumination characteristic in order to equalize the spectral characteristic regardless of wavelengths.

3. The image capturing device according to claim 1, wherein the processor is configured to set another piece of statistical data based on the image signal when the piece of statistical data has been already set and the image signal captured based on the piece of statistical data already set does not satisfy the criterion.

4. The image capturing device according to claim 1, wherein the processor is configured to perform determination on all selectable pieces of statistical data, and determine a piece of statistical data that most conforms to the criterion for achromatic color as a most adequate piece of statistical data.

5. The image capturing device according to claim 1, wherein
the illuminator includes:
a filter having a flat plate shape and configured to transmit light at a transmission center wavelength that continuously changes in a predetermined direction;
a liquid crystal section located closer to a side of the filter from which the light exits and configured to selectively transmit the light at some of the wavelength bands among the light transmitted through the filter; and
a diffusion optical system located at a side of the liquid crystal section from which the light exits and configured to diffuse the light transmitted through the liquid crystal section to equalize the light, and
the liquid crystal section is capable of changing the wavelength bands of the light transmitted.

6. A control method executed by an image capturing device that generates illumination light having a plurality of wavelength bands and an illumination characteristic in accordance with a setting, and generates an image signal by capturing light from a subject, the control method comprising:
generating the image signal;
setting a piece of statistical data that is used for estimating a spectral characteristic of the subject included in the generated image signal;
estimating the spectral characteristic of the subject included in the image signal based on the set piece of statistical data;
defining an illumination characteristic of illumination light in accordance with the estimated spectral characteristic of the subject;

generating an image signal under the illumination light having the defined illumination characteristic; and determining whether or not the set piece of statistical data is an adequate piece of statistical data based on whether or not the image signal generated under the illumination light having the defined illumination characteristic satisfies a criterion for achromatic color.

\* \* \* \* \*